US010753852B2

(12) United States Patent
Mujica (10) Patent No.: US 10,753,852 B2
(45) Date of Patent: Aug. 25, 2020

(54) SMART HIGH INTEGRITY PROTECTION SYSTEM

(71) Applicant: Saudi Arabian Oil Company, Dhahran (SA)

(72) Inventor: Pedro A. Mujica, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 764 days.

(21) Appl. No.: 15/150,862

(22) Filed: May 10, 2016

(65) Prior Publication Data

US 2017/0328827 A1 Nov. 16, 2017

(51) Int. Cl.
*G01N 17/00* (2006.01)
*E21B 43/00* (2006.01)
(Continued)

(52) U.S. Cl.
CPC ........... *G01N 17/006* (2013.01); *E21B 43/00* (2013.01); *G01N 17/00* (2013.01); *G01N 17/04* (2013.01); *F16L 57/06* (2013.01); *F16L 58/00* (2013.01)

(58) Field of Classification Search
CPC ...... G01N 17/006; G01N 17/00; G01N 17/04; E21B 43/00; F16L 58/00; F16L 57/06
(Continued)

(56) References Cited

U.S. PATENT DOCUMENTS 4,215,746 A 8/1980 Hallden et al.
5,446,369 A 8/1995 Byrne et al.
(Continued)

FOREIGN PATENT DOCUMENTS

EP 2592318 5/2013
EP 3054203 8/2016
(Continued)

OTHER PUBLICATIONS

Dutuit, Y., et al.; "Probabilistic Assessments in Relationship with Safety Integrity Levels by Using Fault Trees"; Reliability Engineering and System Safety, Elsevier Applied Science; vol. 93, No. 12; Dec. 1, 2008; pp. 1867-1876.
(Continued)

*Primary Examiner* — Michael P Nghiem
*Assistant Examiner* — Dacthang P Ngo
(74) *Attorney, Agent, or Firm* — Fish & Richardson P.C.

(57) ABSTRACT

A computer-based corrosion/erosion module, communicatively coupled with a probe, estimates corrosion/erosion rates in a pipeline based on metal loss measurements. A High Integrity Protection System (HIPS), upstream of the corrosion/erosion module, includes at least two pressure-sensing elements, connected to the pipeline, for capturing pressure readings associated with inside pressures of the pipeline. The HIPS also includes at least two final elements configured to stop a flow of fluid through the pipeline. A logic solver, coupled with the corrosion/erosion module and the HIPS, is configured to automatically monitor mechanical integrity of the pipeline in real time using the captured pressure readings and estimated metal loss measurements. The logic solver determines a trip set point adjustment using the estimated metal loss measurements and provides the trip set point adjustment to the final elements.

14 Claims, 3 Drawing Sheets

(51) Int. Cl.
  *G01N 17/04* (2006.01)
  *F16L 57/06* (2006.01)
  *F16L 58/00* (2006.01)

(58) Field of Classification Search
  USPC .......................................................... 702/100
  See application file for complete search history.

(56) References Cited

U.S. PATENT DOCUMENTS

| | | | |
|---|---|---|---|
| 5,887,657 | A | 3/1999 | Bussear et al. |
| 6,556,027 | B2 | 4/2003 | Banks |
| 6,880,567 | B2 | 4/2005 | Klaver et al. |
| 7,044,156 | B2 | 5/2006 | Vetco |
| 7,133,727 | B2 | 11/2006 | Van Dyk et al. |
| 7,823,640 | B2 | 11/2010 | Flanders |
| 8,051,875 | B2 | 11/2011 | Edwards |
| 8,161,993 | B2 | 4/2012 | Radcliffe |
| 8,201,624 | B2 | 6/2012 | Flanders |
| 8,327,874 | B2 | 12/2012 | Flanders |
| 8,616,230 | B2 | 12/2013 | Studer |
| 8,725,434 | B2 | 5/2014 | Flanders |
| 8,776,609 | B2 | 7/2014 | Dria et al. |
| 10,221,645 | B2 | 3/2019 | Elliott |
| 2005/0122121 | A1* | 6/2005 | Gilboe .................. G01N 17/04 324/700 |
| 2005/0199286 | A1 | 9/2005 | Appleford et al. |
| 2008/0000529 | A1 | 1/2008 | Edwards |
| 2009/0013807 | A1 | 1/2009 | Webster |
| 2009/0101338 | A1 | 4/2009 | Flanders |
| 2009/0260829 | A1 | 10/2009 | Mathis |
| 2011/0061861 | A1 | 3/2011 | Flanders |
| 2011/0133942 | A1 | 6/2011 | Flanders |
| 2011/0144946 | A1 | 6/2011 | Flanders |
| 2014/0039648 | A1 | 2/2014 | Boult et al. |
| 2014/0114577 | A1 | 4/2014 | Lopezgarcia et al. |
| 2014/0212978 | A1* | 7/2014 | Sharpe, Jr. ......... G05B 23/0272 436/6 |
| 2014/0214326 | A1 | 7/2014 | Samuel et al. |
| 2014/0261778 | A1 | 9/2014 | Hamilton |
| 2015/0027730 | A1 | 1/2015 | Hall et al. |
| 2015/0184497 | A1 | 7/2015 | Whitby |
| 2017/0329356 | A1 | 11/2017 | McKeon et al. |
| 2018/0156004 | A1 | 6/2018 | Hussain |
| 2018/0245452 | A1 | 8/2018 | Mujica |
| 2018/0298738 | A1 | 10/2018 | Mujica et al. |
| 2019/0219230 | A1 | 7/2019 | Simon |

FOREIGN PATENT DOCUMENTS

| | | |
|---|---|---|
| WO | 2012054295 | 4/2012 |
| WO | 2012100044 | 7/2012 |
| WO | 2017196420 | 11/2017 |
| WO | 2017218547 | 12/2017 |
| WO | 2018037084 | 3/2018 |

OTHER PUBLICATIONS

Woods, "Generating Project Value Through Design for Reliability: On the Development and Implementation of a Potential Value Framework," Thesis submitted for degree of Engineering Doctorate at Cranfield University, Oct. 2007, 274 pages.

George, "Subsea Production Equipment Standardisation Initiative," Offshore Technology Conference, OTC-8179-MS, 1996, 2 pages (Abstract only).

International Search Report and Written Opinion issued in International Application No. PCT/US2018/018976 dated May 4, 2018, 15 pages.

International Search Report and Written Opinion of the International Searching Authority issued in International Application No. PCT/US2017/018048 dated May 2, 2017; 14 pages.

International Search Report and Written Opinion issued in International Application No. PCT/US2018/027134 dated Jul. 6, 2018, 16 pages.

European Communication Pursuant to Rules 161(1) and 162 EPC issued in European Application No. 17708369.8 dated Dec. 18, 2018, 3 pages.

Gulf Cooperation Council Examination Report issued in GCC Application No. GC 2017-33199 dated Mar. 19, 2019, 5 pages.

Summers, "Wellhead Flowline Pressure Protection using High Integrity Protective Systems (HIPS)," SIS Tech, available on or before 2017, 7 pages.

Gulf Cooperation Council Examination Report issued in GCC Application No. GC2018-34815 dated Sep. 10, 2019, 4 pages.

Gulf Cooperation Council Examination Report issued in GCC Application No. GC2017-33199 dated Sep. 24, 2019, 5 pages.

* cited by examiner

SMART HIGH INTEGRITY PROTECTION SYSTEM

BACKGROUND

Oil pipelines can be used to carry oil over long distances, for example, from a supply facility to either a refinement facility or an export location. In typical implementations, pipelines can be made of metal, plastic, or other materials and may be buried or above ground. The materials that are used in pipelines can deteriorate over time. Corrosion, for example, can occur and may be caused by chemical reactions between ingredients in the oil and materials in the pipeline, temperature/temperature fluctuations, pipeline pressure, and the like. For example, crude oil or chemicals added to the crude oil (for example to improve pipeline flow) can interact chemically with metal or plastic. Companies that produce, own, or operate pipelines are generally concerned with discovering and preventing possible failures associated with pipeline deterioration.

SUMMARY

The present disclosure describes methods and systems, including computer-implemented methods, computer-program products, and computer systems, for providing integrated protection of pipelines. A computer-based corrosion/erosion module is communicatively coupled with a probe that estimates corrosion/erosion rates in a pipeline based on metal loss measurements. A High Integrity Protection System (HIPS) is positioned upstream of the computer-based corrosion/erosion module. The HIPS includes at least two pressure-sensing elements connected to the pipeline. The least two pressure-sensing elements capture pressure readings associated with inside pressures of the pipeline. The HIPS also includes at least two final elements configured to stop a flow of fluid through the pipeline. A logic solver is coupled with the computer-based corrosion/erosion module and the HIPS. The logic solver is configured to automatically monitor mechanical integrity of the pipeline in real time using the captured pressure readings and estimated metal loss measurements from the computer-based corrosion/erosion module. The logic solver determines a trip set point adjustment using the estimated metal loss measurements. The logic also provides the trip set point adjustment to the final elements.

The methods, computer-program products, and computer systems described herein can be used to help solve problems associated with pipelines, for example, in the areas of mechanical engineering, corrosion/erosion, instrumented protective functions (IPF), and mechanical integrity/inspection.

Pipeline systems that are in service can experience metal wall thinning due to corrosion or erosion in piping networks that are protected by a high integrity protection system (HIPS) or similar system. The systems may not offer the required protection over time due to changes and deterioration in the mechanical robustness/integrity of the downstream system. Detecting corrosion at an earlier point in time can prevent incidents that can occur in production fields due to corrosion mechanisms affecting piping integrity. For example, corrosion information may not currently be analyzed to modify the high-trip settings of the HIPS.

There can be a disconnection between the effects of corrosion and erosion on piping and equipment and the overpressure protection offered by the HIPS. For example, the conditions initially used to design the HIPS can change over time, and the original Maximum Allowable Working Pressure (MAWP) of a system can be impacted by the corrosion/erosion effects. Failure to detect corrosion/erosion can limit the ability of the HIPS to provide overpressure protection under the new degraded conditions (for example, metal losses and wall thinning).

The foregoing and other implementations can each optionally include one or more of the following features, alone or in combination:

A first aspect, combinable with the general implementation, wherein automatically monitoring includes storing the received metal concentration measurements over time and determining, using the received metal concentration measurements and the stored metal concentration measurements, the corrosion/erosion rate for the pipeline.

A second aspect, combinable with any of the previous aspects, wherein automatically monitoring further includes storing a threshold metal concentration and a threshold corrosion/erosion rate associated with HIPS reporting requirements for the pipeline, providing an alarm if the corrosion/erosion rate reaches the threshold corrosion/erosion rate, providing an alarm if the current metal concentration exceeds the threshold metal concentration, and automatically adjusting a trip set point in the logic solver according to an analysis of the data, the preloaded thresholds, and trip set points, the automatically adjusting based on degradation of the MAWP of the downstream piping network.

A third aspect, combinable with any of the previous aspects, wherein monitoring points for the computer-based corrosion/erosion module are at the wellhead or installed at a distance, and wherein the monitoring points for the computer-based corrosion/erosion module communicate with the computer-based corrosion/erosion module.

A fourth aspect, combinable with any of the previous aspects, wherein the fluid in the protected system is a petroleum product comprising oil or gas.

A fifth aspect, combinable with any of the previous aspects, wherein the computer-implemented integrated protection system achieves a safe state when at least two pressure values configured for two-out-of-three voting in the logic solver are met or when a sensed pressure is safe for at least one of two pressure-sensing elements in a one-out-of-two voting configuration.

A sixth aspect, combinable with any of the previous aspects, wherein the HIPS is located at a wellhead or a location remote from the wellhead.

A seventh aspect, combinable with any of the previous aspects, wherein the final elements include HIPS valves, Electrical Submersible Pumps (ESP), or Switchgears.

An eighth aspect, combinable with any of the previous aspects, wherein the integrated protection system is mechanical, electrical and computerized-implemented.

The subject matter described in this specification can be implemented in particular implementations so as to realize one or more of the following advantages. First, pipe failure can be prevented and predicted if pipe wall metal thinning is detected on time. Second, HIPS high-pressure trip set points can be reduced. For example, the action of lowering the HIPS set point typically leans on the safe side, driving the trip set point to a lower value. As such, HIPS trip set points can be set closer to the MAWP. Third, existing proven technologies can be combined and integrated to achieve objectives that existing technologies cannot by themselves (for example, HIPS and online corrosion/erosion monitoring independently operating). For example, losses of containment experienced due to using technologies separately, without having them as an integrated system, can be avoided. Fifth, integrating features of protection against corrosion/erosion into the HIPS can provide an independent protection layer that does not depend on human intervention to protect the mechanical integrity of the asset. Sixth, the described subject matter allows reduction of the potential for loss of pipe contents. In the oil and gas industry, containment is paramount to protect the safety of personnel and public, the environment, and to avoid major financial losses. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes methods and systems, including computer-implemented methods, computer-program products, and computer systems, for providing integrated protection of pipelines. The present disclosure describes a smart High Integrity, Protection System (HIPS) and a method for self-adjusting, self-diagnosis, and constant monitoring of the mechanical integrity of an asset, for example a piping system. This allows real-time adjustments to the trip set point of the protection layer. Integrating the corrosion or erosion online monitoring capabilities as a part of the HIPS system, guarantees and maintains overpressure protection for the life of the asset even when exposed, over time, to metal loss and wall thinning of downstream equipment or piping network.

The following description is presented to enable any person of ordinary skill in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and illustrated implementations, but is to be accorded the widest scope consistent with the principles and features disclosed herein.

For the purposes of this disclosure, the terms "real time," "real-time," "realtime," "real (fast) time (RFT)," "near(ly) real-time (NRT)," "quasi real-time," or similar terms (as understood by one of ordinary skill in the art) mean that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit (or a combination of these or other functions) the data.

In-line monitoring of the corrosion or erosion effects/consequences on the metal walls of vessels or piping will feed an automated/intelligent system that will modify the HIPS pressure trip set points preventing pressure excursion in the process that could rupture the equipment with a degraded condition (wall thinning due metal loss).

Marrying the two proven technologies (HIPS and online corrosion/erosion monitoring systems) using an intelligent system (or through inspection for standalone hydraulic HIPS) will maintain the HIPS systems' ability to offer overpressure protection throughout the life of the asset.

Integration of existing proven technologies (HIPS and Corrosion/Erosion online monitoring) that through a Logic Solver (Solid State or Programmable Logic Controller) and an innovative algorithm interact in real time, gathering data (wall thickness/material loss degradation due to Corrosion or Erosion) from the process to adjust the trip set point of the HIPS based on predicting metal losses that could compromise the mechanical integrity of an equipment, vessel or a piping system, therefore providing assurance that the systems are always protected by the upstream protection.

Figure 1:
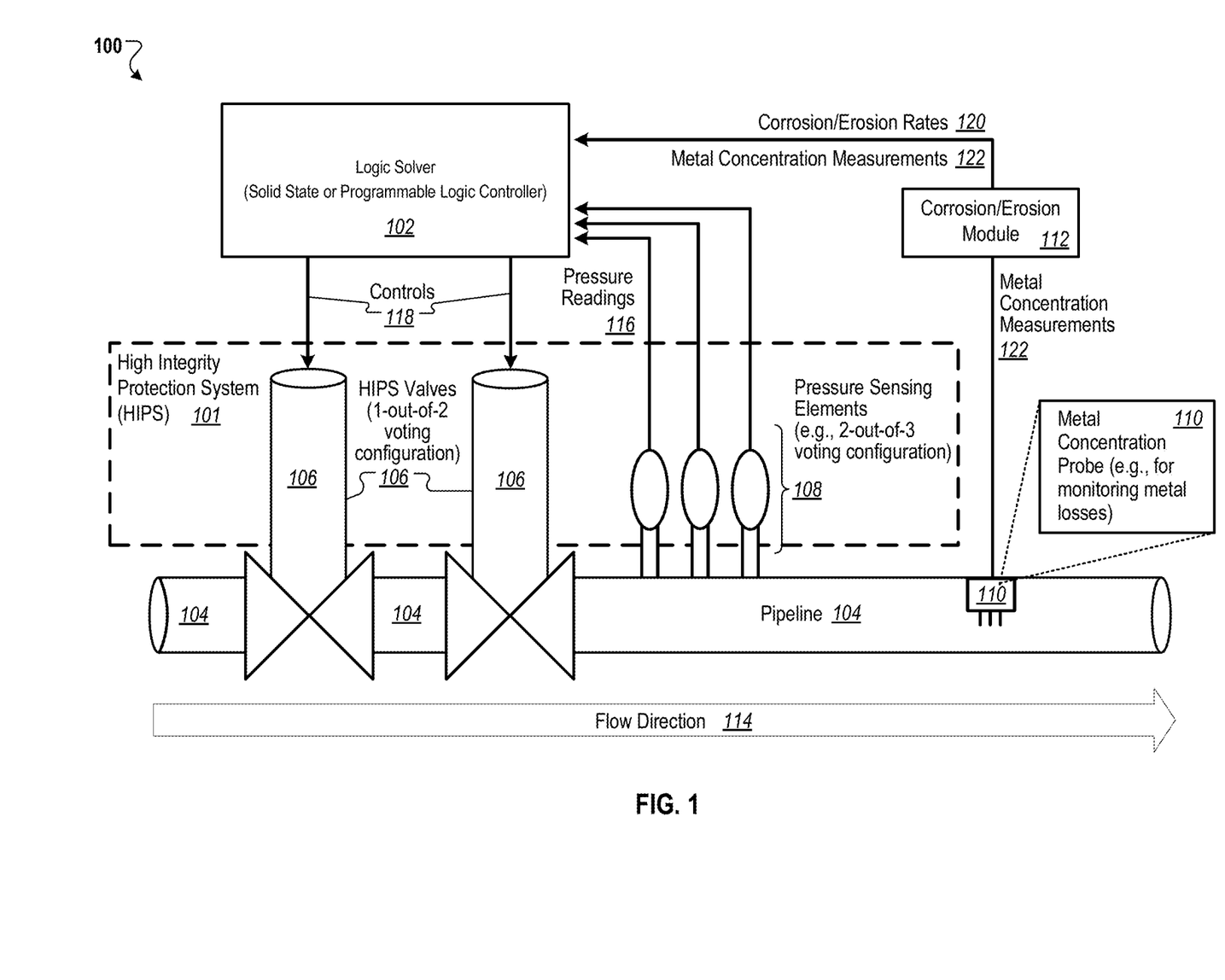
FIG. 1 is a diagram of an example integrated protection system (IPS), according to an implementation.

FIG. 1 is a diagram of an example integrated protection system (IPS) 100, according to an implementation. For example, the IPS 100 can provide a smart high integrity protection system for self-adjusting, self-diagnosis, and constantly monitoring the mechanical integrity of a piping system (for example, a pipeline or pipeline network). The IPS 100 can facilitate real-time adjustments to the trip set point of the protection layer used, for example, on a pipeline. The IPS 100 can be computer-implemented, including at least one computer interoperably coupled with a memory storage. The IPS 100 can be any feasible combination of components that are mechanical, electrical or computerized-implemented. In some implementations, the IPS 100 can be an integrated overpressure protection system, such as determining, managing and protecting against overpressure and related situations. For example, the IPS can determine a trip set point adjustment and provide the trip set point adjustment as a threshold to actuate the final elements.

As shown in FIG. 1, the IPS 100 includes a computer-based corrosion/erosion module 112 communicatively coupled with a probe 110 that estimates corrosion/erosion rates in a pipeline based on metal loss measurements (for example, measures metal concentrations) due to a liquid (for example, oil or some other petroleum product) or a gas that passes through a pipeline 104 with erosive or corrosive elements. In some implementations, monitoring points for the corrosion/erosion module 112 can be at the wellhead or can be installed at a distance where the highest corrosion/erosion rates in the pipe network are expected. The monitoring points can communicate with the corrosion/erosion module 112 using any communication hardware, software, protocol, method, etc. consistent with this disclosure (for example, using a hardwire or a soft link). In some implementations, the oil, gas, or other petroleum product can include (or be mixed with) amounts of natural components, such as produced water, sand, or soil, and can include (or be mixed with) man-made components, such as additives that facilitate the flow of material through a pipeline.

A High Integrity Protection System (HIPS) 101, that is upstream of the computer-based corrosion/erosion module 112, includes at least two pressure-sensing elements 108 (connected to the pipeline 104) that capture pressure readings associated with inside pressures of the pipeline 104. The HIPS 101 also includes at least two final elements (for example, HIPS valves 106) configured to stop a flow of fluid through the pipeline 104. In some implementations, the HIPS 101 can be located at a wellhead or a location remote from the wellhead.

The corrosion/erosion module 112 can receive metal concentration measurements 122 from the probe 110. The corrosion/erosion module 112 can use the received metal concentration measurements 122 to automatically determine and monitor, in real time, corrosion/erosion rates 122 in the pipeline 104. There can be multiple configurations of corrosion/erosion modules 112, each communicatively coupled with one or more probes 110.

The at least one pressure-sensing element 108, connected to the pipeline 104, can capture pressure readings 116 associated with an inside pressure of the pipeline 104. In some implementations, multiple pressure-sensing elements 108 can be used, for example, three pressure-sensing elements 108 in a two-out-of-three voting configuration. Other quantities, configurations, and placements of the pressure-sensing elements 108 along the pipeline 104 are possible.

At least one final element (for example, HIPS valve 106) can be configured to stop flow of the liquid through the pipeline 104. In some implementations, multiple HIPS valves 106 can be used, for example, such as two HIPS valves 106 that are used, for example, in a one-out-of-two voting configuration. For example, either valve is capable to stop the flow of fluid in the pipeline 104 when the pressure trip set point is reached and a logic solver, such as Logic Solver 102, sends a signal to close the HIPS valves 106. Other quantities and arrangements of the HIPS valves 106 are possible. Further, final elements can include valves, or other final elements consistent with this disclosure (for example, Electrical Submersible Pumps (ESPs)).

Logic Solver 102 is coupled with the corrosion/erosion module 112 and the HIPS 101. Logic Solver 102 includes a built-in algorithm to process input from the corrosion/erosion module 112 and can execute logic (e.g., a calculation block) that modifies a high-pressure trip set point according to metal loss prediction. The logic solver is configured to automatically monitor mechanical integrity of the pipeline 104 in real time using the captured pressure readings and estimated metal loss measurements from the corrosion/erosion module 112. The logic solver can determine a trip set point adjustment using the estimated metal loss measurements and actuate the final elements when necessary under the new high pressure set point. For example, the Logic Solver 102 can be configured to adjust a trip set point to trip the HIPS valves 106 based, at least in part, on various inputs that are received. For example, inputs received by the Logic Solver 102 can include corrosion/erosion rates 120 and pressure readings 116 received from the pressure sensor elements 108. The Logic Solver 102 can be solid state or electronic (for example, an electronic programmable logic controller (e-PLC)). The signals received from the Logic Solver 102 by the HIPS valves 106 (or other final points) can include various commands. In some implementations, there can be limit switches, for example, that provide feedback from valve actuators to the logic solver to indicate full closure of the valves. In some implementations, the IPS 100 can achieve a safe state when at least two values are met (for example, by the HIPS valves 106 closing), for example, when the logic solver is configured for two-out-of-three voting from sensing elements 108.

In some implementations, varying types of final elements can be used, such as isolation valves, electrical switch gears to cut power to Electrical Submersible Pumps (ESPs), and Variable Frequency Drives (VFDs) to stop ESPs. Each of these example types of final elements can support the concept of modifying the HIPS trip set point based on mechanical integrity conditions being analyzed by the corrosion/erosion monitor module in one or multiple points within the piping network being protected by the HIPS. For example, information associated with the conditions can constantly feed the Logic Solver 102 to modify, in real time, the HIPS trip set point regardless the type of the final element used for the system (for example, valves, pumps, compressors, and other components).

In some implementations, commands and controls sent by the Logic Solver 102 to the HIPS valves 106 can include commands other than open/close, for example, to stop flow, such as by cutting a source of energy to cut power to electrical pumps, or closing valves to isolate the pressure. Other commands can be used, for example, as a result of monitoring the health of integrated protection system. In some implementations, other commands can be used to achieve an ultimate goal of protecting the downstream system from experiencing overpressure scenarios beyond the actual Maximum Allowable Operating Pressure (MAOP) of the piping network downstream.

In some implementations, the Logic Solver 102 can include custom hardware and software, for example, in an existing Logic Solver type hardware box. As typical high-end Safety Integrity Level (SIL) 3 HIPS applications often use solid-state-type logic solvers, for example, which are non-programmable hardware with hard-wired built-in logic. As a result, implementations of the Logic Solver 102 can include a custom-made solid state logic solvers to include/provide features described in this disclosure. For example, for existing HIPS applications with solid-state logic solvers that may be considered as candidates to include the corrosion monitoring feature as an enhancement, an external Logic Solver can be added to the system. The external Logic Solver, for example, can run algorithms and provide the solid-state logic solver with new trip set points. Further, the external Logic Solver can trip the system due to a detected or suspected compromise of the mechanical integrity downstream. In some implementations, other HIPS applications can use Logic Solvers which can be modified, for example, by adding new logic to include the new capabilities described by his disclosure. In these and other implementations, software-only modifications to existing Logic Solvers may be sufficient, for example, if the available capacity of the Logic Solvers accept new inputs and outputs.

In some implementations, the PLC can use special and proprietary algorithms in combination with basic threshold/comparisons and decision gates based on the comparisons. For example, applications can be implemented in solid-state types of logic solvers, for example, using thresholds/comparisons and decision gates based on actual readings.

In some implementations, the Logic Solver 102 can reside at a control facility of the oil company or some other location. For example, HIPS applications can reside on offshore platforms, or in onshore environments (for example, wellheads in the middle of the desert) with stand-alone units. HIPS applications can communicate using supervisory control and data acquisition (SCADA) systems, for example, a control room for alarming or annunciation. Further, actions can be taken at a standalone unit independently of the communication link, for example, using hard-wired connections for executive actions, to provide high integrity.

In some implementations, the Logic Solver 102, HIPS 101, and corrosion/erosion modules 112 can use hard-wired communications. In some implementations, communications can include soft communication links, for example, using the Intranet and other network(s). The communication techniques that are chosen can depend, for example, on desired integrity levels, for example, for capturing the corrosion degradation at points far from the source of pressure. For example, depending on where the HIPS 101 is usually installed (for example, typically remotely), such configurations can potentially rely on soft links or any other communication protocol to feed the Logic Solver.

In some implementations, monitoring that is done by the corrosion/erosion module 112 (or by other components of the IPS 100, such as the Logic Solver 102) can include storing metal concentration measurements 122 that are received over time. For example, by analyzing stored metal concentration measurements 122, the corrosion/erosion module 112 can determine the corrosion/erosion rate 120 for the pipeline 104. In some implementations, stored metal concentration measurements 122 can include, in addition to quantitative and qualitative metal concentration information, a timestamp indicating when the measurement was taken, location information associated with the probe 110, and other information that is needed over time. In some implementations, the corrosion/erosion module 112 can receive signals and inputs from other reading points (for example, in addition to the probe 110) that collect corrosion/erosion data afar from the wellhead.

In some implementations, monitoring that is done by the corrosion/erosion module 112 (or by other components of the IPS 100, such as the Logic Solver 102), can include storing, for example, a threshold metal concentration and a threshold corrosion/erosion rate associated with HIPS reporting requirements for the pipeline 104. Alarms can be provided, for example, if the corrosion/erosion rate 120 reaches the threshold corrosion/erosion rate or if the current metal concentration exceeds the threshold metal concentration. A trip set point can be automatically adjusted in the logic solver according to an analysis of the data, the pre-loaded thresholds, and trip set points. For example, the automatically adjusting can be based on degradation of a Maximum Allowable Working Pressure (MAWP) of the downstream piping network.

Using the IPS 100, the trip set point can be adjusted according real-time measurements of corrosion or erosion rates. An online corrosion/erosion monitoring system, for example, provided by the corrosion/erosion module 112, can measure the corrosion/erosion rates and provide feedback to the Logic Solver 102. In turn, built-in logic of the Logic Solver 102 can correlate the material loss due to corrosion or erosion mechanisms with the actual MAWP of a piping system (for example, the pipeline 104). Losing material off of the wall of a piping system is generally directly correlated to the capacity of the equipment/piping to withstand pressures. Further, as more material is lost (for example, from the walls of the pipeline 104), less pressure can be withstand by the system. The IPS 100 can be used, for example, to monitor a pipeline over time, as conditions change, such as metal corrosion/erosion in a pipeline.

Depending on the corrosion/erosion monitoring technology selected, corrosion/erosion monitoring systems can analyze the probe 110 readings within the internal module and provide the input to the Logic Solver 102 for adjusting the trip set point. In some implementations, electrical resistance probes can be used in conductive systems, as well as non-conductive environments such as oil, gas, and atmosphere. For example, such systems can monitor and measure a change in resistance of the probe 110 as it is exposed to corrosive/erosive conditions. The information that is determined can be used as an electrical signal to the Logic Solver 102 that can use the information in a programmed logic/algorithm (such as, software or built-in solid state logic), to modify the trip set point.

In some implementations, probes 110 can be spaced in different ways, such as scattered along a pipeline. For example, one probe 110 can be positioned just downstream of the HIPS valves 106 as well as at multiple measuring points, depending on the length of the system and the weakest point(s) such as, those having a higher risk of corrosion/erosion (for example, produced water stagnation/accumulation is known to cause higher corrosion rates, hence low velocity sections of a pipeline or low points where water accumulation is possible may corrode the pipeline 104 faster).

The HIPS' performance is improved by configuring the HIPS as a robust/strong layer of protection for the downstream system, even after years of operation exposed to a corrosive or erosive environment. Due to constant monitoring of equipment mechanical integrity, the HIPS will be capable of using input from the online corrosion/monitoring system to adjust the high-pressure trip set point accordingly.

The logarithmic-based algorithm programmed as part of the PLC to support the corrosion/erosion online monitoring can support diagnosis features used with a Human-Machine interface for annunciation and time stamping of degradation of the conditions being monitored that are correlated to the integrity of the downstream system. The system can be programmed to detect considerable metal loss prior to reducing the trip set point in order to protect what could be the weakest link in the system.

The disclosed subject matter is applicable not only to applications that require smart logic and a PLC, but also can be considered for stand-alone overpressure protection systems deployed in remote areas with hydraulic HIPS type systems.

The hydraulic HIPS units deployed in remote areas are mandated to be tested with prescribed and mandatory frequencies to guarantee the integrity of the components and the availability of the HIPS. The test will prove the functionality of the HIPS, however typically the HIPS high-pressure trip set point is not modified to match the actual condition of the downstream system, and often there is a disconnection with the management of the mechanical integrity of the piping and the integrity of the HIPS systems.

An integrated corrosion monitoring system is part of the disclosed HIPS design, permitting inspection on a regular basis to ascertain the actual condition of the piping system protected against overpressure. This information can be collected by the operators and be part of the lifecycle management of the safety function.

Two important elements of the life cycle management of an asset are interdependent, using a feedback loop able to take an action in real time. The action adjusts the HIPS trip set point based on a prediction of degradation of downstream systems.

Implementation of corrosion or erosion probe/s or a metal loss detection system is used to predict the potential metal loss of downstream piping with dedicated instruments to provide a verification element that will maintain a correlation with the HIPS trip set point and the current state of the piping system.

The corrosion or erosion probe will be integrated with the HIPS skid equipment so it can be tracked, removed and inspected at a prescribed frequency as part of the testing and verification of the associated HIPS system.

The disclosed subject matter provides information on a one-to-one basis regarding pipe conditions over time, which can be extrapolated to the metal loss that the system maybe experiencing downstream. Mechanical integrity of a piping network is an important design feature that could degrade due to corrosion/erosion mechanisms if not maintained. The corrosion/erosion may not be noticed in time to prevent degradation, rendering the HIPS as an ineffective layer of protection.

Current industrial practices establish the HIPS trip setting as a fixed value that is not adjusted over time according to the metal loss that maybe experienced in the system. The disclosed subject matter provides real time critical information using proven technology that allows the correction of the HIPS trip set points protecting the weakest link in the system, in this case a corroded/eroded or degraded section of a vessel or piping network.

Figure 2:
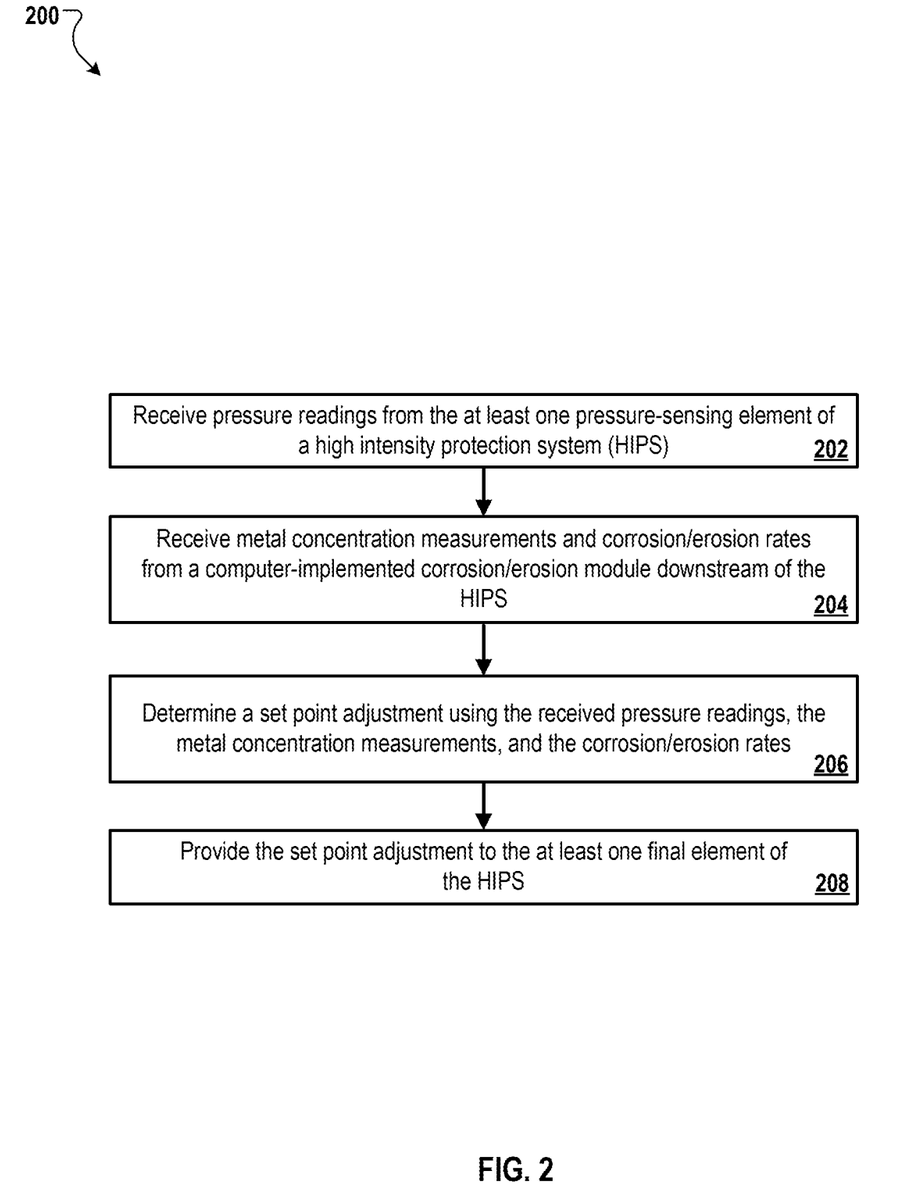
FIG. 2 illustrates a method for protecting a pipeline within an integrated protection system, according to an implementation.

FIG. 2 illustrates a method 200 for protecting a pipeline within an integrated protection system. For clarity of presentation, the description that follows generally describes method 200 in the context of FIG. 1. Method 200 may be performed by any system, environment, software, and hardware, or a combination of systems, environments, software, and hardware as appropriate (for example, the computer system described in FIG. 3 below). In some implementations, various steps of method 200 can be ran in parallel, in combination, in loops, or in any order.

At 202, pressure readings are received from at least one pressure-sensing element of a High Integrity Protection System (HIPS). As an example, the Logic Solver 102 can receive pressure readings 116 from the pressure sensing elements 108. From 202, method 200 proceeds to 204.

At 204, metal concentration measurements and corrosion/erosion rates are received from a computer-implemented corrosion/erosion module downstream of the HIPS. For example, the Logic Solver 102 can receive the corrosion/erosion rates 120 and metal concentration measurements 122 from the corrosion/erosion module 112. In some implementations, the information can be received over time, for example, at regular or scheduled intervals. In some implementations, the information can be received whenever demanded by the Logic Solver 102. In some implementations, the information can be sent by the corrosion/erosion module 112, as needed, for example, when a spike in corrosion/erosion rates 120 is detected or when metal concentration measurements 122 reach a threshold level. From 204, method 200 proceeds to 206.

At 206, a trip set point adjustment is determined using the metal concentration measurements, and the corrosion/erosion rates. As an example, the Logic Solver 102 can determine a trip set point adjustment using industry standard or innovative algorithms and specific guidelines associated with the pipeline 104. From 206, method 200 proceeds to 208. In some implementations, trip set point adjustments can be based, at least in part, on other factors, for example, current seismic or other geo-political conditions, weather conditions, intelligence related to threats to the pipeline's operation, regulatory inputs, and inputs received from the pipeline's owners.

At 208, the trip set point adjustment is provided to the at least one final element of the HIPS. For example, the Logic Solver 102 can provide trip set point adjustments for actuating the final elements valves 106 when the pressure new trip set point is sensed by the sensing elements 108. From 208, method 200 terminates.

Figure 3:
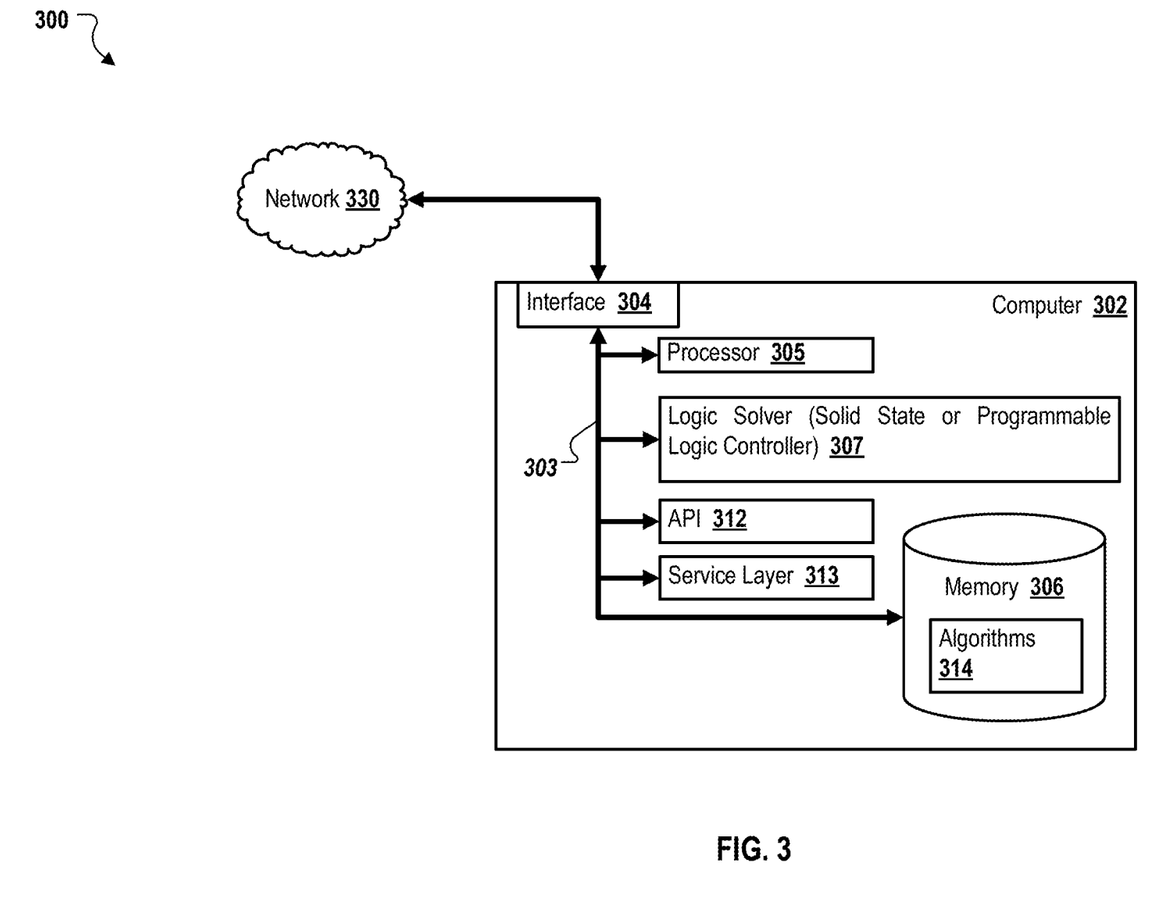
FIG. 3 is a block diagram illustrating an Exemplary Distributed Computer System (EDCS) used for providing integrated protection of a pipeline, according to an implementation.

FIG. 3 is a block diagram illustrating an Exemplary Distributed Computer System (EDCS) 300 used for providing integrated protection of a pipeline, according to an implementation. In some implementations, the EDCS 300 includes a computer 302 and network 330.

The illustrated computer 302 includes a Logic Solver 307 (for example, the Logic Solver 102 or at least one other logic solver) that is coupled with a computer-based corrosion/erosion module and an HIPS. For example, the Logic Solver 307 can be configured to automatically monitor mechanical integrity of a pipeline in real time using captured pressure readings and estimated metal loss measurements from the computer-based corrosion/erosion module. Based on the received information, the Logic Solver 307 can determine (and provide to the HIPS) a trip set point adjustment using the estimated metal loss measurements and provide the trip set point adjustment to final elements of the HIPS.

The illustrated computer 302 is intended to encompass a computing device such as a server, desktop computer, laptop/notebook computer, wireless data port, smart phone, personal data assistant (PDA), tablet computing device, one or more processors within these devices, or any other processing device, including either or both of both physical and virtual instances of the computing device. The computer 302 may comprise a computer that includes an input device, such as a keypad, keyboard, touch screen, or other device (not illustrated) that can accept user information, and an output device (not illustrated) that conveys information associated with the operation of the computer 302, including digital data, visual and audio information, or a user interface.

The computer 302 can serve as a client or a server. In typical implementations, the computer 302 act as either a parallel processing node, a host for a software agent, or other application consistent with this disclosure (even if not illustrated). The illustrated computer 302 is communicably coupled with a network 330 for example that allows the computer 302 to communicate, for example, with the computer-based corrosion/erosion module 112 and the HIPS 101. In some implementations, one or more components of the computer 302 may be configured to operate within a parallel-processing or cloud-computing-based environment. Implementations of the computer 302 can also communicate using message passing interface (MPI) or other interface over network 330.

At a high level, the computer 302 is an electronic computing device operable to receive, transmit, process, store, or manage data and information associated with modeling of reservoir formations and lithofacies distribution. According to some implementations, the computer 302 may also include or be communicably coupled with a simulation server, application server, e-mail server, web server, caching server, streaming data server, business intelligence (BI) server, or other server.

Each of the components of the computer 302 can communicate using a system bus 303. In some implementations, any or all the components of the computer 302, both hardware or software, may interface with each other and the interface 304 over the system bus 303 using an application programming interface (API) 312 or a service layer 313. The API 312 may include specifications for routines, data structures, and object classes. The API 312 may be either computer-language independent or dependent and refer to a complete interface, a single function, or even a set of APIs. The service layer 313 provides software services to the computer 302 or system of which the computer 302 is a part. The functionality of the computer 302 may be accessible for all service consumers using this service layer. Software services, such as those provided by the service layer 313, provide reusable, defined business functionalities through a defined interface. For example, the interface may be software written in JAVA, C++, or other language providing data in extensible markup language (XML) format or other format. While illustrated as an integrated component of the computer 302, alternative implementations may illustrate the API 312 or the service layer 313 as stand-alone components in relation to other components of the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment—including a parallel processing environment—connected to the network 330 (whether illustrated or not). For example, the interface 304 can facilitate communications with the computer-based corrosion/erosion module 112 and the HIPS 101. Generally, the interface 304 comprises logic encoded in software or hardware operable to communicate with the network 330. More specifically, the interface 304 may comprise software supporting one or more communication protocols associated with communications over network 330.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302.

The computer 302 also includes a memory 306 that holds data for the computer 302 or other components of a system of which the computer is a part. Although illustrated as a single memory 306 in FIG. 3, two or more memories may be used according to particular needs, desires, or particular implementations of the computer 302. While memory 306 is illustrated as an integral component of the computer 302, in alternative implementations, memory 306 can be external to the computer 302. In some implementations, for example, memory 306 can hold algorithms 314 used for protecting a pipeline system.

There may be any number of computers 302 associated with a computer system performing functions consistent with this disclosure. Further, the term "client," "user," and other appropriate terminology may be used interchangeably as appropriate without departing from the scope of this disclosure. Moreover, this disclosure contemplates that many users/processes may use one computer 302, or that one user/process may use multiple computers 302.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, for example, a central processing unit (CPU), a co-processor (for example, a graphics/visual processing unit (GPU/VPU)), a FPGA (field programmable gate array), or an ASIC (application-specific integrated circuit). In some implementations, the data processing apparatus or special purpose logic circuitry may be hardware-based or software-based. The apparatus can optionally include code that creates an execution environment for computer programs, for example, code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, a FPGA, or an ASIC.

Computers for executing a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) for storing computer program instructions and data include all forms of non-volatile memory, media and memory devices, including by way of example semiconductor memory devices, for example, erasable programmable read-only memory (EPROM), electrically-erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20, all or a portion of the Internet, or any other communication system or systems at one or more locations. The network may communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software, may interface with each other or the interface using an application programming interface (API) or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other language providing data in extensible markup language (XML) or other format. The API and service layer may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and integration of various system modules and components in the implementations described above should not be understood as requiring such separation or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. An integrated protection system, comprising:
   a computer-based corrosion/erosion module communicatively coupled with a probe, wherein the computer-based corrosion/erosion module is configured to estimate corrosion/erosion rates in a pipeline based on metal loss measurements;
   a High Integrity Protection System (HIPS) upstream of the computer-based corrosion/erosion module, the HIPS comprising:
     at least two pressure-sensing elements connected to the pipeline and capturing pressure readings associated with inside pressures of the pipeline; and
     at least two final elements configured to stop a flow of fluid through the pipeline; and
   a logic solver coupled with the computer-based corrosion/erosion module and the HIPS, the logic solver configured to:
     automatically monitor mechanical integrity of the pipeline in real time using the captured pressure readings and estimated metal loss measurements from the computer-based corrosion/erosion module, wherein the automatically monitoring comprises:
       storing a threshold metal concentration and a threshold corrosion/erosion rate associated with HIPS reporting requirements for the pipeline;
       providing an alarm if the corrosion/erosion rate reaches the threshold corrosion/erosion rate;
       providing an alarm if current metal concentration exceeds the threshold metal concentration; and
       automatically adjusting a trip set point in the logic solver according to an analysis of data, preloaded thresholds, and trip set points, the automatically adjusting based on degradation of a Maximum Allowable Working Pressure of a downstream piping network;
     determine a trip set point adjustment using metal concentration measurements and the corrosion/erosion rates that are received from the computer-based corrosion/erosion module; and
     provide the trip set point adjustment that is determined based on the metal concentration measurements and the corrosion/erosion rates to the at least two final elements of the HIPS.

2. The integrated protection system of claim 1, wherein monitoring points for the computer-based corrosion/erosion module are at a wellhead or installed at a distance, and wherein the monitoring points for the computer-based corrosion/erosion module communicate with the computer-based corrosion/erosion module.

3. The integrated protection system of claim 1, wherein the fluid in the protected system is a petroleum product comprising oil or gas.

4. The integrated protection system of claim 1, wherein the integrated protection system achieves a safe state when at least two pressure values configured for two-out-of-three voting in the logic solver are met or when a sensed pressure is safe for at least one of the at least two pressure-sensing elements in a one-out-of-two voting configuration.

5. The integrated protection system of claim 1, wherein the HIPS is located at a wellhead or a location remote from the wellhead.

6. The integrated protection system of claim 1, wherein the final elements include HIPS valves, Electrical Submersible Pumps (ESP), or switch gears.

7. The integrated protection system of claim 1, wherein the integrated protection system is mechanical, electrical and computerized-implemented.

8. A computer-implemented method comprising:
   receiving pressure readings from at least one pressure-sensing element of a High Integrity Protection System (HIPS);
   receiving metal concentration measurements and corrosion/erosion rates from a computer-implemented corrosion/erosion module downstream of the HIPS;
   automatically monitoring mechanical integrity of a pipeline in real time using the pressure readings and estimated metal loss measurements from the computer-implemented corrosion/erosion module, wherein the automatically monitoring comprises:
     storing a threshold metal concentration and a threshold corrosion/erosion rate associated with HIPS reporting requirements for the pipeline;
     providing an alarm if the corrosion/erosion rate reaches the threshold corrosion/erosion rate;
     providing an alarm if current metal concentration exceeds the threshold metal concentration; and
     automatically adjusting a trip set point according to an analysis of data, preloaded thresholds, and trip set points, the automatically adjusting based on degradation of a Maximum Allowable Working Pressure of a downstream piping network;

determining a trip set point adjustment using the metal concentration measurements and the corrosion/erosion rates that are received from the computer-implemented corrosion/erosion module; and providing the trip set point adjustment that is determined based on the metal concentration measurements and the corrosion/erosion rates to at least one HIPS valve.

9. The computer-implemented method of claim 8, wherein monitoring points for the computer-implemented corrosion/erosion module are at a wellhead or installed at a distance, and wherein the monitoring points for the computer-implemented corrosion/erosion module communicate with the computer-implemented corrosion/erosion module.

10. The computer-implemented method of claim 8, wherein fluid in the protected system is a petroleum product comprising oil or gas.

11. The computer-implemented method of claim 8, wherein a safe state is achieved when at least two pressure values configured for two-out-of-three voting are met or when a sensed pressure is safe for at least one of the at least two pressure-sensing elements in a one-out-of-two voting configuration.

12. A non-transitory, computer-readable medium storing computer-readable instructions executable by a computer and configured to:

receive pressure readings from at least one pressure-sensing element of a High Integrity Protection System (HIPS);

receive metal concentration measurements and corrosion/erosion rates from a computer-implemented corrosion/erosion module downstream of the HIPS;

automatically monitor mechanical integrity of a pipeline in real time using the pressure readings and estimated metal loss measurements from the computer-implemented corrosion/erosion module, wherein the automatically monitoring comprises:

storing a threshold metal concentration and a threshold corrosion/erosion rate associated with HIPS reporting requirements for the pipeline;

providing an alarm if the corrosion/erosion rate reaches the threshold corrosion/erosion rate;

providing an alarm if current metal concentration exceeds the threshold metal concentration; and automatically adjusting a trip set point according to an analysis of data, preloaded thresholds, and trip set points, the automatically adjusting based on degradation of a Maximum Allowable Working Pressure of a downstream piping network;

determining a trip set point adjustment using the metal concentration measurements and the corrosion/erosion rates that are received from the computer-implemented corrosion/erosion module; and provide the trip set point adjustment that is determined based on the metal concentration measurements and the corrosion/erosion rates to at least one HIPS valve.

13. The non-transitory, computer-readable medium of claim 12, wherein monitoring points for the computer-implemented corrosion/erosion module are at a wellhead or installed at a distance, and wherein the monitoring points for the computer-implemented corrosion/erosion module communicate with the computer-implemented corrosion/erosion module.

14. The non-transitory, computer-readable medium of claim 12, wherein fluid in the protected system is a petroleum product comprising oil or gas.

* * * * *

UNITED STATES PATENT AND TRADEMARK OFFICE
CERTIFICATE OF CORRECTION

PATENT NO. : 10,753,852 B2
APPLICATION NO. : 15/150862
DATED : August 25, 2020
INVENTOR(S) : Pedro Alejandro Mujica Page 1 of 1

It is certified that error appears in the above-identified patent and that said Letters Patent is hereby corrected as shown below:

In the Claims

Column 18, Line 16, Claim 12, delete "determining" and insert -- determine --.

Signed and Sealed this
Twenty-seventh Day of October, 2020

Andrei Iancu
*Director of the United States Patent and Trademark Office*